United States Patent [19]
Gill et al.

[11] Patent Number: 5,875,418
[45] Date of Patent: Feb. 23, 1999

[54] COMPENSATION FOR UNDESIRED ANGLE DEVIATIONS ARISING DURING VEHICLE WHEEL ALIGNMENT OPERATIONS

[75] Inventors: George Michael Gill, Vilonia, Ark.; Patrick Brendan O'Mahony, Cork, Ireland; Donald Walchuk, Conway, Ark.

[73] Assignee: Snap-On Technologies, INC., Lincolnshire, Ill.

[21] Appl. No.: 868,741

[22] Filed: Jun. 4, 1997

[51] Int. Cl.⁶ ............................. G01B 5/24; G01B 7/30
[52] U.S. Cl. ............. 702/150; 364/528.14; 33/203.18; 356/439.09
[58] Field of Search ............... 364/559, 551.01, 364/528.14, 528.15; 33/203.18, 288; 356/139.09, 155; 701/29, 41; 702/150

[56] References Cited

U.S. PATENT DOCUMENTS

| | | | |
|---|---|---|---|
| 4,126,943 | 11/1978 | Senften | 33/203.18 |
| 4,143,970 | 3/1979 | Lill | 356/155 |
| 4,249,824 | 2/1981 | Weiderrich et al. | 356/155 |
| 4,381,548 | 4/1983 | Grossman et l. | 364/559 |
| 4,718,759 | 1/1988 | Butler | 356/139.09 |
| 5,014,227 | 5/1991 | Kling et al. | 364/559 |
| 5,301,110 | 4/1994 | Spainhour et al. | 33/203.18 |
| 5,335,420 | 8/1994 | Kling, III et al. | 33/203.18 |
| 5,553,389 | 9/1996 | Winslow et al. | 33/203.18 |
| 5,675,515 | 10/1997 | January | 364/559 |

Primary Examiner—John Barlow
Assistant Examiner—Bryan Bui
Attorney, Agent, or Firm—McDermott, Will & Emery

[57] ABSTRACT

Undesired deviations in wheel angle measurements caused by compression forces inherent in alignment operations are corrected. A vehicle wheel is placed in a particular orientation both before and after an alignment procedure, and respective angle measurements are taken each time. Any difference in these angle measurements must be the result of an undesired deviation. Such deviation quantities may then be monitored by an operator or compensated during subsequent angle measurements by a computer alignment system.

24 Claims, 1 Drawing Sheet

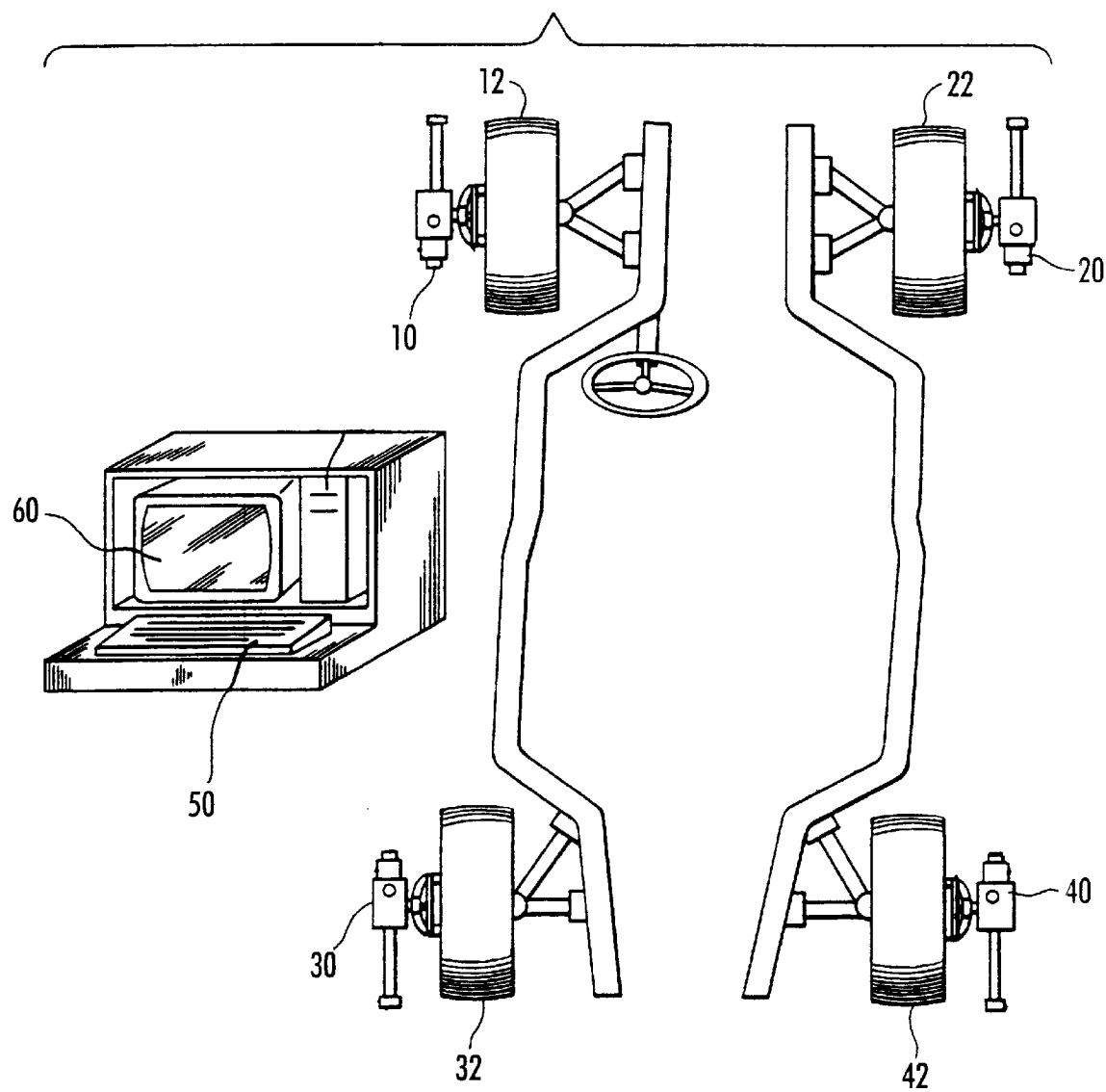
FIG_1

COMPENSATION FOR UNDESIRED ANGLE DEVIATIONS ARISING DURING VEHICLE WHEEL ALIGNMENT OPERATIONS

BACKGROUND OF THE INVENTION

The present invention relates to a novel method and apparatus for performing accurate vehicle wheel alignment procedures. More specifically, the present invention relates to a method and apparatus for detecting, displaying, and/or compensating for transient undesired changes in suspension angle measurements caused by compression forces incident to an alignment operation.

When a vehicular wheel alignment is performed, several alignment related operations may induce transient suspension alignment angle changes. These changes are viewed as undesired deviations from true measurements. This is because in an ideal wheel alignment procedure, the only factor causing changes in alignment angles ought to be the mechanic's own deliberate adjustment of those angles.

The most prominent operation that induces these deviations and transients is lifting the vehicle leaving the wheels unsupported. Some examples of operations involving lifting the vehicle are wheel runout compensation and general alignment angle adjustment procedures (such as for camber, caster, SAI, or toe) for vehicles for which it is desirable to have the weight of the vehicle off its wheels. U.S. Pat. No. 4,180,915, issued to Lill et al., describes a prior art runout compensation operation. When the vehicle is lowered, the vehicle's suspension does not necessarily return to its original condition. The sensed alignment angles change after the vehicle is raised and then lowered even though no adjustments have been made. Worse, if adjustments have been made, the values obtained while the vehicle is lowered do not reflect the adjustments made while the vehicle was lifted. This is due to certain compression and decompression forces incident to the lifting and lowering. In sum, the suspension must be returned to its original condition at which the vehicle is driven. If further alignment angle adjustments are performed before the suspension is returned to its original condition, they will not be correct. Because of this phenomenon, some vehicle manufacturers recommend that their vehicle not be lifted off its wheels during a wheel alignment. For such vehicles, this removes a potentially valuable and time saving aid for the wheel alignment mechanic.

Other operations induce such deviations as well. For example, caster and SAI (steering axis inclination) swings often require that the steerable wheels be turned ten degrees to the left and right. The toe out on turns operation and the measurement of the Ackerman principle similarly usually require turning the steerable wheels. The maximum turns operation usually requires that each wheel is turned to its maximum turn angle. Indeed any operation that requires displacement of the wheels in translational space or about the steering axis might cause such transient suspension alignment angle changes. Such operations can cause the suspension to undergo certain compression and decompression forces that cause the sensed alignment angles to change.

Jouncing (bouncing) the suspension is the traditional way of overcoming these deviations and of restoring the vehicle wheel alignment to its normal condition. Jouncing induces a sharp impulse into the system that has the effect of undoing the error-inducing compressions. Until now, mechanics had no guidance on when and how much to jounce the vehicle. Sometimes mechanics wrongly omit the jouncing step. This omission virtually assures that the above mentioned errors will infect the alignment procedure. Sometimes mechanics jounce only once where more than one jounce is necessary to smooth out the transient alignment angle deviations. What is needed then is a way to monitor, warn of, and/or compensate for deviation angles caused by these transient forces. What is also needed is an apparatus that can instruct an alignment mechanic on when and how much to jounce a vehicle.

It is an object of the invention to overcome the above disadvantages and to provide a method and apparatus to monitor deviation angles caused by undesired compression forces during a wheel alignment operation.

It is another object of the invention to warn a mechanic when such deviation angles exceed a threshold acceptable value.

It is still another object of the invention to instruct the mechanic to jounce the vehicle until the undesired compression forces that cause the deviation angle are eliminated.

It is yet another object of the invention to provide more accurate alignment procedures that are not infected by transient suspension alignment angle changes.

It is a further object of the invention to prompt and lead a mechanic through a procedure that accomplishes the foregoing objects.

It is a still further object of the invention to provide an apparatus that accomplishes the foregoing objects.

SUMMARY OF THE INVENTION

It accordance with the foregoing objects, in one aspect, the invention comprises a method for detecting deviations in alignment angles during a wheel alignment procedure on a vehicle having a plurality of wheels comprising the steps of placing a vehicle wheel in a first orientation, obtaining and storing a preselected alignment angle while the vehicle wheel is in the first orientation to acquire a first angle, performing an alignment operation, returning the vehicle wheel to the first orientation, measuring the preselected angle to acquire a second angle, comparing the first and second angle to obtain a deviation quantity, and displaying the deviation quantity for inspection by an operator, whereby the operator may observe undesired changes in alignment angles caused by the alignment operation.

In another aspect, the invention comprises a method for detecting deviations in alignment angles during a wheel alignment procedure on a vehicle having a plurality of wheels comprising the steps of placing a vehicle wheel in a first orientation, obtaining and storing a preselected alignment angle while the vehicle wheel is in the first orientation to acquire a first angle, performing an alignment operation, returning the vehicle wheel to the first orientation, measuring the preselected angle to acquire a second angle, comparing the first and second angle to obtain a deviation quantity, storing the deviation quantity; and compensating subsequent measurements in the vehicle alignment procedure using the deviation quantity, whereby subsequent measurements are corrected for undesired changes caused by the alignment operation.

In a further aspect, the invention comprises a method for performing a vehicle alignment procedure on a vehicle having a plurality of wheels while the vehicle is lifted comprising the steps of placing a vehicle wheel in a first orientation, obtaining and storing a preselected alignment angle while the vehicle wheel is in the first orientation to acquire a first angle, lifting the vehicle, obtaining and storing the preselected alignment angle while the vehicle wheel is lifted to acquire a second angle, performing an alignment adjustment operation to bring the alignment angle within specification wherein after adjustment the alignment angle comprises a current value, adding the first angle to the current value and subtracting the second angle to provide a third angle, lowering the vehicle, returning the vehicle wheel to the first orientation, measuring the preselected alignment angle while the vehicle wheel is lowered to acquire a fourth angle, comparing the third and fourth angle to obtain a deviation quantity, and displaying the deviation quantity for inspection by an operator, whereby the operator may observe deviations in alignment angles caused by the alignment operation.

In another aspect, the invention comprises an apparatus to assist a mechanic in accomplishing the foregoing methods, for example using an apparatus for detecting deviations in alignment angles during a vehicle wheel alignment procedure comprising an alignment assembly having a plurality of sensors responsive to alignment angles on a vehicle's wheels, the plurality of sensors coupled to a controller for processing the signals received therefrom, the controller coupled to indicator means operable to indicate alignment angles for the vehicle's wheels in response to the signals, the improvement comprising means for obtaining and storing a first preselected alignment angle at a first vehicle wheel orientation to provide a first angle, means for making a subsequent measurement of the preselected angle at the first vehicle wheel orientation to provide a second angle, means in the controller for comparing the first and second angles to provide a deviation quantity and for informing the operator through the indicator means when the deviation quantity exceeds a preselected amount.

BRIEF DESCRIPTION OF THE DRAWINGS

FIG. 1 is a stylized plan view with portions removed of the apparatus of the present invention, including a perspective view of a computer.

DESCRIPTION OF THE PREFERRED EMBODIMENTS

In the preferred embodiments, the invention is accomplished using a specially adapted traditional vehicle wheel alignment apparatus, such as the VISUALINER line of alignment equipment manufactured by the John Bean Corporation, the assignee herein. The VISUALINER includes a set of four sensor heads 10, 20, 30, 40, each containing two sets of infrared emitters and two sets of infrared receivers (not shown in detail). In operation, the sensor heads are placed on the four wheels of a vehicle 12, 22, 32, 42. The heads are coupled to a computer 50 containing a microprocessor and appropriate software. The heads send signals to the microprocessor that are indicative of the various alignment angles on the vehicle, such as toe, caster, camber, SAI, and others. The computer 50 is coupled to a display 60 that provides an output that indicates these alignment angles, and further indicates the magnitude and direction of any change necessary to bring these alignment angles into specification. A number of features of this prior art system are disclosed in U.S. Pat. No. 5,519,488, issued to Dale, Jr. et al., owned by the assignee hereof, whose teachings and disclosure are hereby incorporated by reference.

One embodiment of the present invention is specifically designed for monitoring or compensation of deviation angles in alignment procedures where no actual adjustments are made while the vehicle is lifted. In this embodiment, the computer 50 software is programmed in the conventional way to enable the following tasks. First, the display 60 prompts and leads the technician through the operation of bringing a particular alignment angle on a particular wheel into a preselected orientation, such as by equalizing front toe. The technician then steers the front steerable wheels until the left wheel's 12 individual toe and/or the right wheel's 22 individual toe are equalized within an established tolerance. The front wheels 12, 22 are now in a preselected orientation that will become useful later in the procedure as well. Through user feedback or any other suitable means, the computer 50 is informed that the front wheels are now in the preselected orientation.

Now the computer 50, which continually receives sensor input that is converted to respective alignment angles, saves the sensed alignment angle (i.e., front toe) for each wheel 12, 22. At this point, the display prompts the technician either to lift and lower the vehicle while performing an alignment operation, or to complete another non-adjustment procedure that tends to displace the wheels in translation space or about the steering axis. For instance, a maximum turns procedure involves steering wheels 12, 22 all the way to one side and then all the way to the other. It is well understood that lifting and lowering the vehicle, or displacing the wheels in any significant respect, causes undesired compression forces that induce deviations in the angle measurements.

User feedback or any other suitable means informs the computer that the alignment operation is complete. Now the display 60 again prompts the user to position the front vehicle wheels 12, 22 in the preselected orientation. User feedback or other suitable means informs the computer that this is done. Now the computer saves the sensed alignment angle again (i.e., front toe). The microprocessor performs a subtraction operation to find a deviation angle, representative of the difference between the alignment angles sensed the first time and the alignment angles sensed the second time. The deviation angle represents the amount of transient error introduced into the angle measurements by undesired compression forces caused by the alignment operation.

The deviation angle is used in any of several ways. In one use, the display indicates to the operator the magnitude and direction of any deviation angle. The operator can then use his own judgment in deciding whether the vehicle needs to be jounced. Alternatively, the deviation angle is compared to a pre-stored tolerance and a warning generated in the event the deviation angle is beyond an accepted threshold. Such warning can be audible, such as an alarm, or visual, such as a textual or graphic message on the display 60. The warning indicates the need for the operator to jounce the vehicle to eliminate or minimize the deviation in angle measurements. In either case, while the jouncing is performed, the computer continues to compute the deviation angle in real time using a current value for the alignment angle at the preselected orientation and the earlier stored value for the same angle. In this way, the computer continually monitors and provides feedback to the operator on the sufficiency of the curative action. In a further alternative use for vehicles in which it is not desired to jounce the suspension, the deviation angle is merely stored and later used to offset alignment angles during actual adjustment procedures. In this way, a mechanic can wait until the end of a full alignment procedure before jouncing the vehicle to correct for deviation angles, or not jounce at all.

Another embodiment of the present invention is designed for monitoring or compensation of deviation angles in alignment procedures where alignment adjustments are performed while the vehicle is lifted. As before, the software is programmed in the conventional way to enable the operator to complete the following tasks. First, the display prompts and leads the technician through the operation of bringing a particular alignment angle on a particular wheel into a preselected orientation, such as by equalizing front toe. The technician then steers the front steerable wheels 12, 22 until the left wheel's individual toe and/or the right wheel's individual toe are equalized within an established tolerance. The front wheels are now in a preselected orientation that will become useful later in the procedure as well. Through user feedback or any other suitable means, the computer is informed that the front wheels 12, 22 are now in the preselected orientation.

Now the computer 50, which continually receives sensor input that is converted to respective alignment angles, saves the sensed alignment angle (i.e., front toe) for each wheel. At this point, the display 60 prompts the technician to lift the vehicle. User feedback or any other suitable means informs the computer that the lifting operation is complete. Immediately upon the vehicle being lifted, the computer saves the sensed alignment angle a second time for each wheel. Now the display leads the operator through whatever adjustment procedure needs to be done to correct the wheel alignment, such as to bring camber, caster or toe into specification. The computer compensates for the fact that the vehicle is lifted by subtracting the second stored angle from the first stored angle to obtain a lift factor. This lift factor is added to the sensed angles while the vehicle is lifted. In this way, the computer is made insensitive to the fact that the vehicle is lifted and the customary specification values may be used to adjust and correct the alignment angles.

With the adjustment complete, the computer 50 saves an alignment-adjusted angle representing the sum of the lift factor and the current sensed angle. The display 60 prompts the operator to lower the vehicle. User feedback or any other suitable means informs the computer that the lowering operation is complete. Now the display 60 again prompts the user to position the front vehicle wheels in the preselected orientation. Again, user feedback or other suitable means informs the computer that this is done. Now the computer saves the sensed alignment angle yet again (i.e., front toe). The microprocessor performs a subtraction operation between this result and the stored alignment adjusted angle to find a deviation angle, representative of the difference between the alignment angles sensed the first time and the alignment angles sensed the second time. The deviation angle represents the amount of transient error introduced into the angle measurements by undesired compression forces caused by the lifting and lowering operation.

As before, the deviation angle is used in any of several ways. In one use, the display 60 indicates to the operator the magnitude and direction of any deviation angle. The operator can then use his own judgment in deciding whether the vehicle needs to be jounced. Alternatively, the deviation angle is compared to a pre-stored tolerance and a warning generated in the event the deviation angle is beyond an accepted threshold. Such warning can be audible, such as an alarm, or visual, such as a textual or graphic message on the display 60. Of course, other kinds of warnings might go beyond the audible or the visual, such as through vibrations or other tactile stimuli. The warning indicates the need for the operator to jounce the vehicle to eliminate or minimize the deviation in angle measurements. In either case, while the jouncing is performed, the computer continues to compute the deviation angle in real time using a current value for the alignment angle at the preselected orientation and the earlier stored value for the same angle. In this way, the computer continually monitors and provides feedback to the operator on the sufficiency of the curative action. In a further alternative use for vehicles in which it is not desired to jounce the suspension, the deviation angle is merely stored and later used to offset alignment angles during actual adjustment procedures. In this way, a mechanic can wait until the end of a full alignment procedure before jouncing the vehicle to correct for deviation angles, or not jounce at all.

It is understood that the foregoing disclosed embodiments are in no way limiting and that other embodiments may be suitable for practicing the invention as claimed.

We claim:

1. A method for detecting deviations in alignment angles during a wheel alignment procedure on a vehicle having a plurality of wheels comprising the steps of:

placing a vehicle wheel in a first orientation;

obtaining and storing a preselected alignment angle while the vehicle wheel is in the first orientation to acquire a first angle;

performing an alignment operation;

returning the vehicle wheel to the first orientation;

measuring the preselected angle while the vehicle wheel is in the first orientation to acquire a second angle;

comparing the first and second angle to obtain a deviation quantity; and displaying the deviation quantity for inspection by an operator, whereby the operator may observe undesired changes in alignment angles caused by the alignment operation.

2. The method of claim 1 wherein the vehicle wheel is a steerable wheel, the preselected alignment angle comprises toe angle of the steerable wheel, and the first and second angles are indicative of the toe angle of the steerable wheel.

3. The method of claim 1 wherein the preselected alignment angle comprises a selected one of toe, camber, caster or SAI.

4. The method of claim 1 wherein the alignment operation comprises performing a runout compensation procedure.

5. The method of claim 4 wherein the alignment operation comprises lifting the vehicle before performing the runout compensation procedure.

6. The method of claim 5 wherein the alignment procedure further comprises returning the vehicle to an initial unlifted state after performing the runout compensation procedure.

7. The method of claim 1 wherein the alignment operation comprises lifting the vehicle and returning the vehicle to an unlifted state.

8. The method of claim 1 wherein the alignment operation comprises performing a selected one of a maximum turn procedure, a caster/SAI swing procedure, a toe out on turns procedure or an Ackerman principle measurement procedure.

9. The method of claim 1 further comprising finding the difference between the first and second angles to acquire the deviation quantity.

10. The method of claim 1 further comprising:

obtaining and storing a specification value for the deviation quantity representing an acceptable range for the deviation quantity;

comparing the specification value with the deviation quantity; and providing a warning to the operator if the deviation quantity falls outside the acceptable range.

11. The method of claim 10 further comprising instructing the operator to jounce the vehicle if the deviation quantity falls outside the acceptable range.

12. The method of claim 10 wherein the warning is audible.

13. The method of claim 10 wherein the warning is visual.

14. A method for detecting deviations in alignment angles during a wheel alignment procedure on a vehicle having a plurality of wheels comprising the steps of:

placing a vehicle wheel in a first orientation;

obtaining and storing a preselected alignment angle while the vehicle wheel is in the first orientation to acquire a first angle;

performing an alignment operation;

returning the vehicle wheel to the first orientation;

measuring the preselected angle to acquire a second angle;

comparing the first and second angle to obtain a deviation quantity;

storing the deviation quantity; and compensating subsequent measurements in the vehicle alignment procedure using the deviation quantity, whereby subsequent measurements are corrected for undesired changes caused by the alignment operation.

15. The method of claim 14 further comprising subtracting the deviation quantity from subsequent measurements in the vehicle alignment procedure.

16. A method for correcting for deviations in alignment angles caused by undesired compression forces during a wheel alignment procedure on a vehicle having a plurality of wheels comprising the steps of:

placing a steerable vehicle wheel in a straight ahead orientation;

obtaining and storing toe angle while the steerable vehicle wheel is in the straight ahead orientation to acquire a first angle;

performing a selected one of a maximum turn procedure or a runout compensation procedure, the runout compensation procedure including the steps of lifting the vehicle and subsequently replacing the vehicle to an unlifted state;

returning the steerable vehicle wheel to the straight ahead orientation;

measuring toe angle to acquire a second angle;

comparing the first and second angle to obtain a deviation quantity;

storing the deviation quantity;

subtracting the deviation quantity from a subsequent angle measurement in the vehicle alignment procedure to obtain a corrected subsequent angle measurement adjusted for the undesired effects of compression forces caused during the alignment operation.

17. A method for performing a vehicle alignment procedure on a vehicle having a plurality of wheels while the vehicle is lifted comprising the steps of:

placing a vehicle wheel in a first orientation;

obtaining and storing a preselected alignment angle while the vehicle wheel is in the first orientation to acquire a first angle;

lifting the vehicle;

obtaining and storing the preselected alignment angle while the vehicle wheel is lifted to acquire a second angle;

performing an alignment adjustment operation to bring the alignment angle within specification wherein after adjustment the alignment angle comprises a current value;

adding the first angle to the current value and subtracting the second angle to provide a third angle;

lowering the vehicle;

returning the vehicle wheel to the first orientation;

measuring the preselected alignment angle while the vehicle wheel is lowered to acquire a fourth angle;

comparing the third and fourth angle to obtain a deviation quantity; and displaying the deviation quantity for inspection by an operator, whereby the operator may observe deviations in alignment angles caused by the alignment operation.

18. The method of claim 17 wherein the preselected alignment angle comprises a selected one of toe, camber, caster or SAI.

19. The method of claim 17 further comprising:

obtaining and storing a specification value for the deviation quantity representing an acceptable range for the deviation quantity;

comparing the specification value with the deviation quantity; and providing a warning to the operator if the deviation quantity falls outside the acceptable range.

20. The method of claim 19 further comprising instructing the operator to jounce the vehicle if the deviation quantity falls outside the acceptable range.

21. The method of claim 19 wherein the warning is audible.

22. The method of claim 19 wherein the warning is visual.

23. An apparatus for detecting deviations in alignment angles during a vehicle wheel alignment procedure comprising an alignment assembly having a plurality of sensors responsive to alignment angles on a vehicle's wheels, the plurality of sensors coupled to a controller for processing the signals received therefrom, the controller coupled to indicator means operable to indicate alignment angles for the vehicle's wheels in response to the signals, the improvement comprising:

means for obtaining and storing a first preselected alignment angle at a first vehicle wheel orientation to provide a first angle;

means for making a subsequent measurement of the preselected angle at the first vehicle wheel orientation to provide a second angle;

means in the controller for comparing the first and second angles to provide a deviation quantity and for informing the operator through the indicator means when the deviation quantity exceeds a preselected amount.

24. An apparatus for performing a vehicle wheel alignment procedure while a vehicle is lifted comprising an alignment assembly having a plurality of sensors responsive to alignment angles on a vehicle's wheels, the plurality of sensors coupled to a controller for processing the signals received therefrom, the controller coupled to indicator means operable to indicate alignment angles for the vehicle's wheels in response to the signals, the improvement comprising:

means for lifting and lowering the vehicle;

means for obtaining and storing a first preselected alignment angle at a first vehicle wheel orientation while the vehicle is lowered to provide a first angle;

means for obtaining and storing a first preselected alignment angle while the vehicle is lifted to provide a second angle;

means for making a subsequent measurement of the preselected angle at the first vehicle wheel orientation while the vehicle is lifted and after the performance of an alignment operation to provide a current value;

means in the controller for adding the first angle to the current value and subtracting the second angle to provide a third angle;

means for obtaining and storing the preselected angle at the first vehicle wheel orientation after the vehicle is lowered after the performance of an alignment operation to provide a fourth angle;

means in the controller for comparing the third and fourth angles to provide a deviation quantity and for informing the operator through the indicator means when the deviation quantity exceeds a preselected amount.

* * * * *